United States Patent
Heo et al.

(10) Patent No.: US 11,527,053 B2
(45) Date of Patent: Dec. 13, 2022

(54) METHOD AND APPARATUS OF PROCESSING IMAGE

(71) Applicant: SAMSUNG ELECTRONICS CO., LTD., Suwon-si (KR)

(72) Inventors: Jingu Heo, Yongin-si (KR); Byong Min Kang, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 477 days.

(21) Appl. No.: 16/542,663

(22) Filed: Aug. 16, 2019

(65) Prior Publication Data

US 2020/0193205 A1 Jun. 18, 2020

(30) Foreign Application Priority Data

Dec. 12, 2018 (KR) .................. 10-2018-0159883

(51) Int. Cl.
*G06V 10/25* (2022.01)
*G06T 1/60* (2006.01)
*H04N 1/21* (2006.01)

(52) U.S. Cl.
CPC .............. *G06V 10/25* (2022.01); *G06T 1/60* (2013.01); *H04N 1/215* (2013.01)

(58) Field of Classification Search
None
See application file for complete search history.

(56) References Cited

U.S. PATENT DOCUMENTS

| 9,525,814 | B2 | 12/2016 | Chen |
| 9,674,465 | B2 | 6/2017 | Shan et al. |
| 9,897,807 | B2 | 2/2018 | LaValle et al. |
| 9,898,866 | B2 | 2/2018 | Fuchs et al. |

(Continued)

FOREIGN PATENT DOCUMENTS

| JP | 5159532 B2 | 3/2013 |
| KR | 10-2015-0075906 A | 7/2015 |

(Continued)

OTHER PUBLICATIONS

Lopez-Lagunas, Abelardo et al., "Memory Bandwidth Optimization through Stream Descriptors", ACM SIGARCH Computer Architecture News, vol. 34, No. 1, Mar. 2006, pp. 57-64, XP040044293. (8 pages total).

(Continued)

*Primary Examiner* — Leon Viet Q Nguyen
(74) *Attorney, Agent, or Firm* — Sughrue Mion, PLLC

(57) ABSTRACT

An image processing method and an image processing apparatus are provided. The image processing method includes acquiring information of a first region of interest (ROI) in a first frame, estimating information of a second ROI in a second frame that is received after the first frame, based on the acquired information of the first ROI, and sequentially storing, in a memory, subframes that are a portion of the second frame, each of the subframes being a line of the second frame. The image processing method further includes determining whether a portion of the stored subframes includes the second ROI, based on the estimated information of the second ROI, and based on the portion of the stored subframes being determined to include the second ROI, processing the portion of the stored subframes.

30 Claims, 7 Drawing Sheets

(56) References Cited

U.S. PATENT DOCUMENTS

| | | | |
|---|---|---|---|
| 9,953,428 | B2 | 4/2018 | Gren et al. |
| 10,037,601 | B1* | 7/2018 | Ben-Ari ............... G06K 9/6226 |
| 2007/0154202 | A1 | 7/2007 | Lee et al. |
| 2009/0097704 | A1 | 4/2009 | Savidge et al. |
| 2009/0208122 | A1* | 8/2009 | Taketa ................. H04N 19/137 382/236 |
| 2010/0200660 | A1* | 8/2010 | Moed ....................... G06K 7/14 235/470 |
| 2015/0365610 | A1* | 12/2015 | Dominguez Castro ..................... H04N 5/345 348/308 |
| 2017/0094190 | A1 | 3/2017 | Melakari |
| 2017/0208251 | A1 | 7/2017 | Shamir et al. |
| 2017/0264829 | A1 | 9/2017 | Zhou |
| 2018/0137406 | A1 | 5/2018 | Howard et al. |
| 2018/0165792 | A1 | 6/2018 | Tavakoli et al. |
| 2019/0332897 | A1* | 10/2019 | Chen .................. G06K 9/00771 |
| 2021/0135753 | A1* | 5/2021 | Nijssen ................ H04N 5/3532 |

FOREIGN PATENT DOCUMENTS

| | | |
|---|---|---|
| KR | 10-1610512 B1 | 4/2016 |
| KR | 10-2017-0011873 A | 2/2017 |
| KR | 10-1810956 B1 | 12/2017 |

OTHER PUBLICATIONS

Communication (EP SR) dated Mar. 2, 2020 by the European Patent Office in counterpart European Patent Application No. 19214939.1.

\* cited by examiner

METHOD AND APPARATUS OF PROCESSING IMAGE

CROSS-REFERENCE TO RELATED APPLICATION

This application claims priority from Korean Patent Application No. 10-2018-0159883, filed on Dec. 12, 2018, in the Korean Intellectual Property Office, the disclosure of which is incorporated herein by reference in its entirety.

BACKGROUND

1. Field

Methods and apparatuses consistent with example embodiments relate to an image processing method and an image processing apparatus.

2. Description of the Related Art

A great amount of processing time may be used to process visual information in a computer vision field. Therefore, many image processing methods may focus on reducing a latency of a processing time by using a plurality of high-performance graphic processing units (GPUs) and a low complexity deep learning algorithm in combination.

In an application that requires fast computational processing, for example, an autonomous driving application, a latency used to transmit sensing information of a camera to a processor may become a very significant delay factor.

SUMMARY

According to example embodiments, there is provided an image processing method including acquiring information of a first region of interest (ROI) in a first frame, estimating information of a second ROI in a second frame that is received after the first frame, based on the acquired information of the first ROI, and sequentially storing, in a memory, subframes that are a portion of the second frame, each of the subframes being a line of the second frame. The image processing method further includes determining whether a portion of the stored subframes includes the second ROI, based on the estimated information of the second ROI, and based on the portion of the stored subframes being determined to include the second ROI, processing the portion of the stored subframes.

The information of the first ROI may include any one or any combination of position information of the first ROI, size information of the first ROI, and shape information of the first ROI.

The image processing method may further include sequentially receiving the subframes, using a camera of a rolling shutter method.

The estimating of the information of the second ROI may include setting the acquired information of the first ROI as the information of the second ROI.

The estimating of the information of the second ROI may include adjusting the acquired information of the first ROI, and determining the adjusted information of the first ROI as the information of the second ROI.

The second frame may follow the first frame.

The line of the second frame may be either horizontal or vertical.

The sequentially storing of the subframes may include accumulating the subframes on a region that is pre-allocated in the memory.

The image processing method may further include storing line information of a subframe that is stored last among the subframes, every time one of the subframes is stored.

The image processing method may further include shifting a first logic value in a shift register corresponding to the second frame, every time one of the subframes is stored.

The processing of the portion of the stored subframes may include tracking the second ROI, based on the portion of the stored subframes, and updating the information of the second ROI, based on a result of the second ROI being tracked.

The processing of the portion of the stored subframes may include masking a remaining subframe excluding the second ROI, in the second frame, and processing the second ROI, using the second frame in which the remaining subframe is masked.

The image processing method may further include, based on the portion of the stored subframes being determined to not include the second ROI, storing, in the memory, a next subframe that is a line of the second frame, as one of the stored subframes.

A non-transitory computer-readable storage medium may store instructions that, when executed by a processor, cause the processor to perform the image processing method.

According to example embodiments, there is provided an image processing apparatus including a processor configured to acquire information of a first region of interest (ROI) in a first frame, and estimate information of a second ROI in a second frame that is received after the first frame, based on the acquired information of the first ROI. The image processing apparatus further includes a memory configured to sequentially store subframes that are a portion of the second frame, each of the subframes being a line of the second frame. The processor is further configured to determine whether a portion of the stored subframes includes the second ROI, based on the estimated information of the second ROI, and based on the portion of the stored subframes being determined to include the second ROI, process the portion of the stored subframes.

The information of the first ROI may include any one or any combination of position information of the first ROI, size information of the first ROI, and shape information of the first ROI.

The image processing apparatus may further include a communication interface configured to sequentially receive the subframes acquired, using a camera of a rolling shutter method.

The processor may be further configured to set the acquired information of the first ROI as the information of the second ROI.

The processor may be further configured to adjust the acquired information of the first ROI, and determine the adjusted information of the first ROI as the information of the second ROI.

The second frame may follow the first frame.

The line of the second frame may be either horizontal or vertical.

The memory may be further configured to accumulate the subframes on a region that is pre-allocated in the memory.

The processor may be further configured to store line information of a subframe that is stored last among the subframes, every time one of the subframes is stored.

The processor may be further configured to shift a first logic value in a shift register corresponding to the second frame, every time one of the subframes is stored.

The processor may be further configured to track the second ROI, based on the portion of the stored subframes, and update the information of the second ROI, based on a result of the second ROI being tracked.

The processor may be further configured to mask a remaining subframe excluding the second ROI, in the second frame, and process the second ROI, using the second frame in which the remaining subframe is masked.

The memory may be further configured to, based on the portion of the stored subframes being determined to not include the second ROI, store a next subframe that is a line of the second frame, as one of the stored subframes.

The processing of the portion of the stored subframes may include patching the portion of the stored subframes, and tracking the second ROI, using the patched portion of the stored subframes.

DETAILED DESCRIPTION

Figure 1:
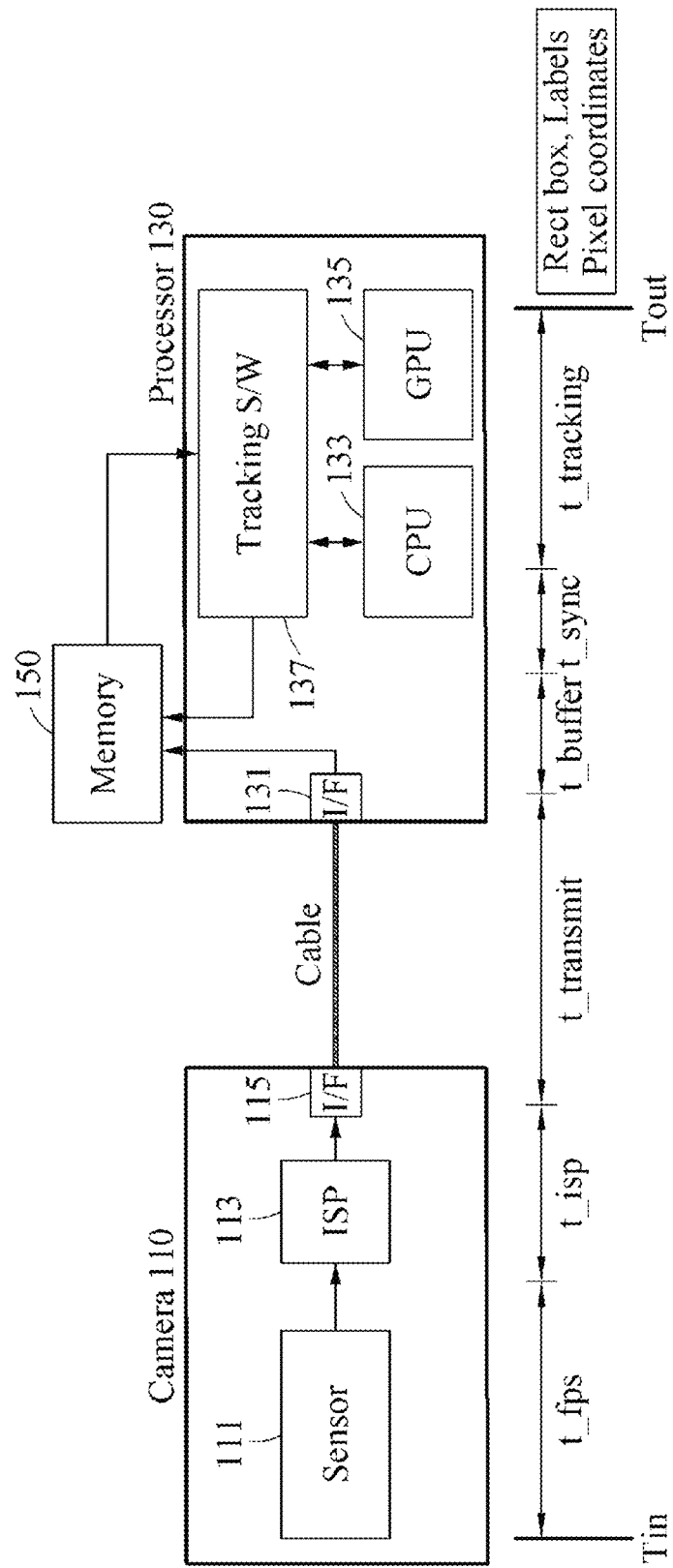
FIG. 1 is a diagram illustrating a total latency used for image processing, according to an example embodiment.

Reference will now be made in detail to example embodiments, examples of which are illustrated in the accompanying drawings, wherein like reference numerals refer to the like elements throughout. Example embodiments are described below to explain the disclosure by referring to the figures.

The following structural or functional descriptions are example to describe the example embodiments, and the scope of the example embodiments is not limited to the descriptions provided in the present specification. Various changes and modifications can be made thereto by those of ordinary skill in the art.

Although terms of "first" or "second" are used to explain various components, the components are not limited to the terms. These terms may be used only to distinguish one component from another component. For example, a "first" component may be referred to as a "second" component, or similarly, and the "second" component may be referred to as the "first" component within the scope of the right according to the concept of the disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. The terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used may be construed to have meanings matching with contextual meanings in the related art and are not to be construed as an ideal or excessively formal meaning unless otherwise defined herein.

The following example embodiments may be applied to recognize a user, to display a line in an augmented reality (AR) system, or to generate visual information for assisting steering of an autonomous driving vehicle. Also, the example embodiments may be applied to track visual information and assist safe and pleasant driving in a device that includes a smart system, such as a head-up display (HUD) installed for driving assistance or complete autonomous driving of a vehicle. The example embodiments may be applied to, for example, a smartphone, a mobile device, a navigation, an autonomous driving vehicle, and a smart vehicle. Like reference numerals illustrated in the drawings refer to like elements.

FIG. 1 is a diagram illustrating a total latency used for image processing, according to an example embodiment. FIG. 1 illustrates a total latency used for an image captured from a camera 110 to be output through a memory 150 and a processor 130.

Referring to FIG. 1, the camera 110 may include a sensor 111 configured to sense an image or an image frame, an image signal processor (ISP) 113 configured to process the image or the image frame, and a communication interface (I/F) 115 configured to output image information including the processed image or image frame. The camera 110 may be a camera of a rolling shutter method configured to sense and process the image based on a unit of a line.

The processor 130 may include a communication interface (I/F) 131 configured to receive the image information including the image frame from the camera 110, a tracking software (S/W) block 137 configured to track a region of interest (ROI) and/or an object of interest, a central processing unit (CPU) 133 configured to run tracking software, and a graphic processing unit (GPU) 135.

The memory 150 may store image information including the image frame, received from the camera 110, and/or a processing result of the processor 130.

The total latency may be represented as "Total_latency=Tout−Tin=t_fps+t_isp+t_transmit+t_buffer+t_sync+t_tracking." Here, t_fps denotes a latency used for the sensor 111 to sense the image or the image frame and may be represented based on, for example, a frame per second (fps). Further, t_isp denotes a latency used for the ISP 113 to process the image sensed in the camera 110.

Also, t_transmit denotes a latency used to transmit image information transmitted through the communication interface 115 of the camera 110 to the communication interface 131 of the processor 130, and t_buffer denotes a latency used to store the image information received at the communication interface 131 in the memory 150.

Also, t_sync denotes a latency used for synchronization between an operating system (OS) run in the processor 130 and the tracking software block 137, and t_tracking denotes a latency used for the tracking software block 137 to track an ROI and/or an object of interest from the image.

The processor 130 may output information of an ROI in the image as a final region. Information of the ROI in the image may include, for example, a rectangle box information corresponding to the ROI, labels of the object of interest and pixel coordinates of the ROI.

For example, when two or more frames (1 frame=1/60 s, 16.7 m) are used for image information transmitted from the camera 110 to reach the tracking software block 137 and a user-recognizable latency is 20 ms, even a latency, for example, t_buffer and t_sync, used before the processor 130 processes visual information may not be neglected.

As described above, various factors may affect the total latency. Here, an amount of time used to sense and transmit image information received through the communication interface 131 based on each line unit may be very short (e.g., t<1 ms) over the total latency. Also, the ISP 113 may be run and optimized through a high rate operation.

According to an example embodiment, a greatest latency may be a time, for example, t_buffer, used to wait for a single frame to be fully stored in the memory 150 and to wait for tracking software of the tracking software block 137 to read the buffered frame from the memory 150, that is, a waiting time, for example, t_sync, occurring due to unmatching sync between an operating system and tracking software. In this case, the total latency in a camera sensing structure of a rolling shutter method may be briefly defined as "Total_latency=t_buffer+t_sync+t_tracking".

Also, the tracking time of tracking software, that is, t_tracking, may correspond to a processing time that is generally known, and may be reduced through algorithm optimization and performance enhancement of the GPU 135. In this case, the total latency may be reduced by reducing t_buffer and t_sync.

For example, when the processing time of tracking software is 5 ms and, in this instance, t_buffer uses 1 frame (1/60s, 16.7 ms) and t_sync uses 1 frame, 33.4 ms of the total latency may be used before processing of tracking software is performed. For example, when a user-sensible latency is about 20 ms, the user may sufficiently sense the latency.

According to the following example embodiments, t_buffer may be reduced by not waiting for a frame to be fully stored in the memory 150. Also, t_buffer and t_sync may be reduced in such a manner that tracking software actively reads only information of a desired region from information stored in the memory 150. In this manner, the total latency may be reduced.

Figure 2:
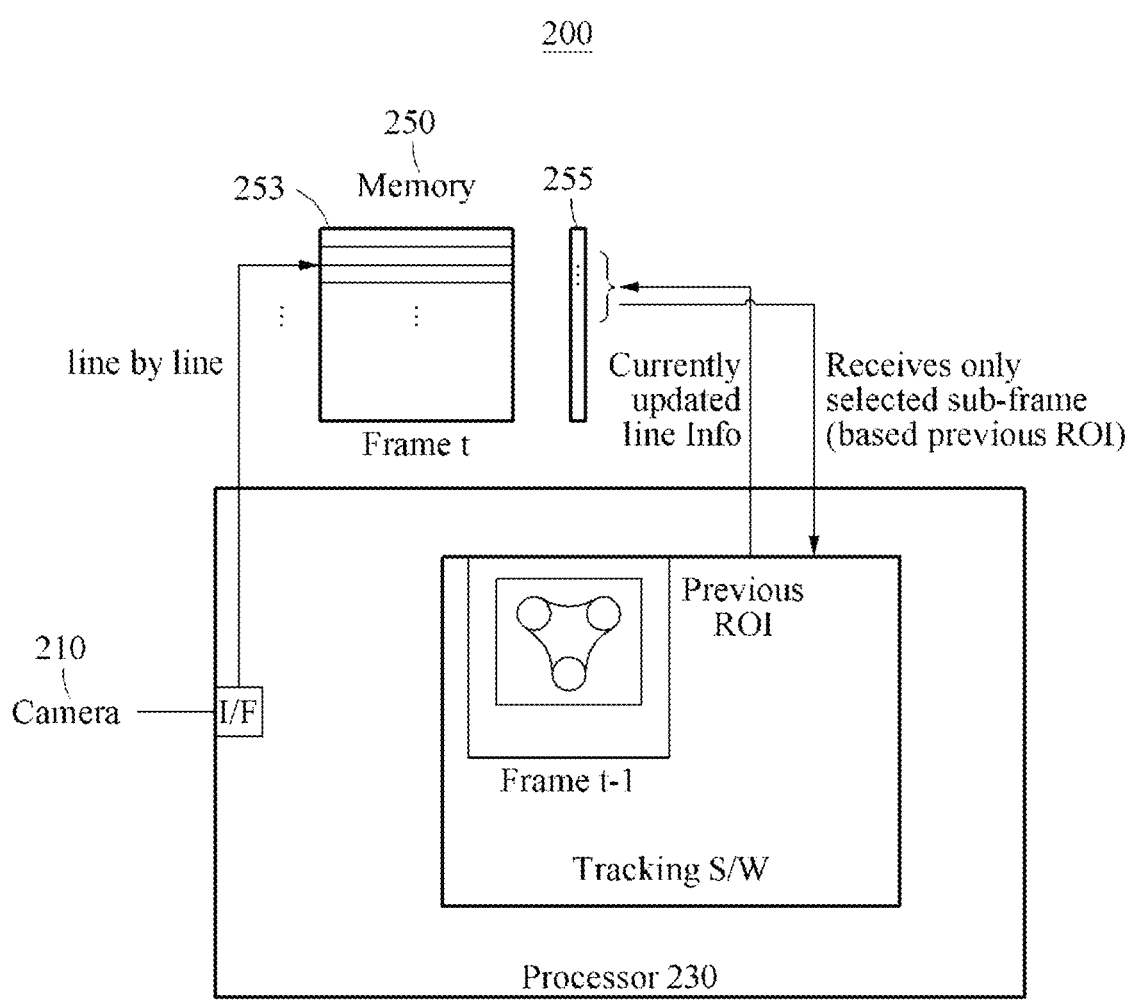
FIG. 2 is a diagram illustrating an operation of an image processing apparatus, according to an example embodiment.

FIG. 2 is a diagram illustrating an operation of an image processing apparatus, according to an example embodiment. Referring to FIG. 2, an image processing apparatus 200 includes a camera 210, a processor 230, and a memory 250.

The image processing apparatus 200 may verify whether information, for example, information of an ROI in a current frame, is stored in the memory 250 based on information of an ROI that is acquired by tracking software from a previous frame. Here, information of the ROI acquired from the previous frame may include, for example, information of the ROI in the previous frame, that is, rectangle box information corresponding to the ROI and pixel coordinates of the ROI. The ROI may refer to a region that includes a target object for which image processing is to be performed. The target object may be a partial region of a face, such as an eye, an eyebrow, and a nose of a user, and may be a vehicle, a pedestrian, a road, a building, a lane, and a line included in a driving image. However, they are provided as examples only.

The memory 250 may further include a separate memory 255 in addition to a memory 253 configured to store a frame.

The separate memory 255 may be used to verify a line that is currently being updated among line-based subframes that constitute a single frame, that is, to verify whether necessary information is being stored. Depending on example embodiments, the separate memory 255 may be replaced with a separate storage space of the memory 253.

The image processing apparatus 200 may verify whether all of the necessary information is accumulated by continuously observing the separate memory 255. Here, the separate memory 255 may be, for example, a shift register, a cyclic shift register, or a storage device similar thereto.

Once all of the necessary information is verified to be accumulated, the image processing apparatus 200 may transmit information to the tracking software included in the processor 230 without waiting until a single frame is fully stored in the memory 253, such that tracking on the current frame may be performed. By performing tracking immediately as soon as current necessary information is accumulated in the memory 253, it is possible to minimize t_buffer.

For example, when a time used for a single piece of line information sensed by the camera 210 to reach is assumed as t_line, t_line may be determined based on an FPS and a horizontal resolution of the camera 210. If FPS=60 and resolution of frame=VGA (640×480), t_line may be determined as 1/60 sec (=16.7 ms)/480 and may be estimated as about 35 µs.

However, when information used by a computer vision is at least a minimum of 30×30 pixels, recognition and/or tracking is possible. When the information is 100×100 pixels, even detailed tracking may be performed.

When an average resolution for tracking is 60×60, a time (t_patch) used for an image of a desired resolution to be patched from a desired line and accumulated in the memory 253 may be 60*35 µs, that is, about 2 ms. Accordingly, although it is assumed that a latency used until tracking software performs tracking is 2 ms and tracking software uses about 5 ms for tracking, the image processing apparatus 200 may perform all of the processing and output a processing result with a total of 7 ms.

As described above, according to an example embodiment, a latency may be minimized by reading only necessary information from a current frame using significant information acquired from a previous frame, for example, ROI, object labels, and pixel coordinates. The image processing apparatus 200 may process visual information within a time less than a time in which the user may sense a latency. The method may be applied to any of fields using a camera sensor, for example, object detection, object segmentation, and object recognition, in addition to an object tracking field among visual information processing fields.

According to an example embodiment, a previous frame refers to a frame that is sensed in, for example, a time t−1 and a current frame refers to a frame that is sensed in a time t after the previous frame. The previous frame and the current frame may be consecutive frames and frames at a desired time interval. Hereinafter, for clarity of description, the previous frame is also referred to as a first frame and the current frame is also referred to as the second frame. Also, an ROI in the previous frame is also referred to as a first ROI and an ROI in the current frame is also referred to as a second ROI. The first ROI and the second ROI may be at the same position and at adjacent positions.

Figure 3:
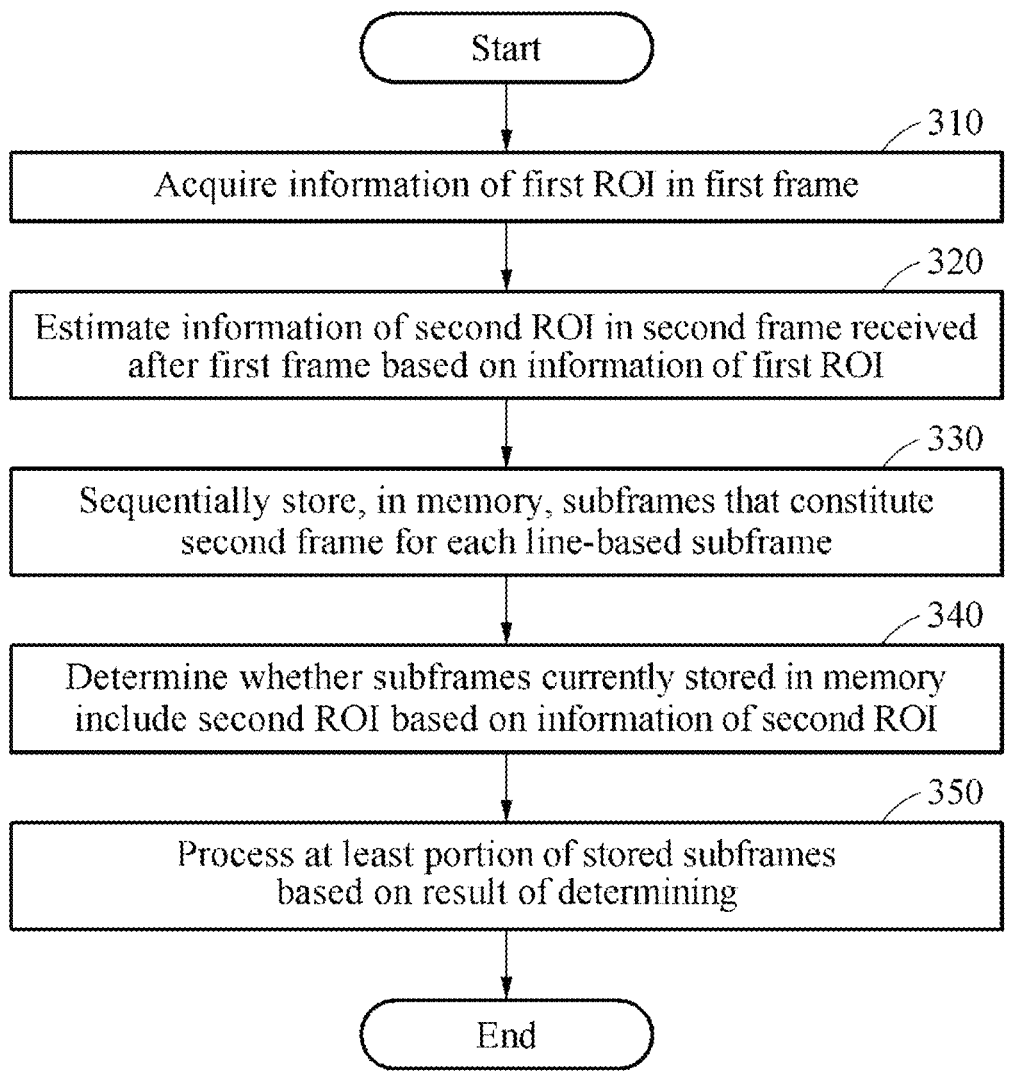
FIG. 3 is a flowchart illustrating an image processing method according to an example embodiment.

FIG. 3 is a flowchart illustrating an image processing method according to an example embodiment. Referring to FIG. 3, in operation 310, an image processing apparatus according to an example embodiment acquires information of a first ROI in a first frame. Here, information of the first ROI may include any one or any combination of, for example, position information of the first ROI, size information of the first ROI, and shape information of the first ROI.

In operation 320, the image processing apparatus estimates information of a second ROI in a second frame received after the first frame based on information of the first ROI. Here, the second frame may be a frame following the first frame and may be a frame present at a desired time interval from the first frame. For example, the image processing apparatus may set information of the first ROI as information of the second ROI. Alternatively, the image processing apparatus may estimate information of the second ROI by adjusting information of the first ROI. A method of estimating, by the image processing apparatus, information of the second ROI will be further described with reference to FIG. 4.

In operation 330, the image processing apparatus sequentially stores, in a memory, subframes that constitute the second frame for each line-based subframe, that is, each line-by-line subframe. Here, the line-based subframes that constitute the second frame may be sequentially received from, for example, a camera of a rolling shutter method. The image processing apparatus may sequentially store the subframes constituting the second frame in the memory for each subframe of a horizontal line unit or a vertical line unit. The image processing apparatus may accumulate the subframes in a region pre-allocated in the memory.

Also, in operation 330, the image processing apparatus may store line information corresponding to a subframe that is stored last among the subframes every time storing is completed for each subframe. For example, when the second frame includes 30 subframes based on a line unit, the image processing apparatus may store a first line that is line information corresponding to a first subframe when storing of the first subframe among the 30 subframes is completed. Sequentially, when storing of a second subframe among the 30 subframes is completed, the image processing apparatus may store a second line that is line information corresponding to the second subframe. Depending on example embodiments, with respect to line-based subframes that constitute the second frame, the image processing apparatus may sequentially store subframes starting from an intermediate line or a line at a desired position.

The image processing apparatus may store line information by shifting a first logic value in a shifter register corresponding to the second frame every time storing is completed for each subframe. Here, the shift register corresponding to the second frame may be understood as a memory that stores a value corresponding to a line unit for each of the subframes of the second frame. The shift register may be, for example, a cyclic shift register.

For example, when the second frame includes 16 subframes based on a line unit, the shifter register corresponding to the second frame may include 16 bits. Here, when storing of up to a third subframe among 16 subframes is completed, a first logic value up to a third bit may be shifted in the shift register corresponding to the second frame to be '1' and e line information of a subframe that is currently filled in the memory may be stored. The value of the shift register may be "1110000000000000" or "0010000000000000".

In operation 340, the image processing apparatus determines whether subframes currently stored in the memory include the second ROI based on information of the second ROI. For example, when position information of the first ROI, that is, pixel coordinates of the first ROI are set as information of the second ROI, the image processing apparatus may determine whether the subframes currently stored in the memory are outside the pixel coordinates of the first ROI. Alternatively, when the adjusted information of the first ROI is estimated as information of the second ROI, the image processing apparatus may determine whether the stored subframes include the adjusted information of the first ROI, for example, an adjusted position of a rectangle box or whether the stored subframes are outside the adjusted information. Based on the aforementioned determination, the image processing apparatus may determine whether the subframes currently stored in the memory include the second ROI.

In operation 350, the image processing apparatus processes at least a portion of the stored subframes based on a result of determining. For example, when the stored subframes are determined to not include the second ROI, the image processing apparatus may read a line-based next subframe that constitutes the second frame. Conversely, when the stored subframes are determined to include the second ROI, the image processing apparatus may process at least a portion of the stored subframes.

Also, in operation 350, the image processing apparatus may track the second ROI based on the stored subframes. The image processing apparatus may update information of the second ROI based on the tracking result.

Alternatively, the image processing apparatus may mask a remaining subframe excluding the second ROI in the second frame. The image processing apparatus may process the second ROI using the masked second frame. Depending on example embodiments, the image processing apparatus may detect an object of interest by tracking the second ROI using a neural network. For example, when an image standard of the second frame is greater than or less than that of an image used for training a convolutional neural network (CNN), the image processing apparatus may process a second ROI of the image with a different size by masking some subframe regions of the second frame in the aforementioned manner.

The image processing apparatus may explicitly or implicitly output a result of processing at least a portion of the stored subframes. "Explicitly output the processing result" may include, for example, displaying an object of interest included in the second ROI of the second frame on a screen or a map and/or outputting the object of interest using an audio. Alternatively, "implicitly output the processing result" may include recognizing a user, controlling a vehicle, determining a position of the vehicle, or setting or changing a route of the vehicle using a position and a size of the updated second ROI of the second frame.

Figure 4A:
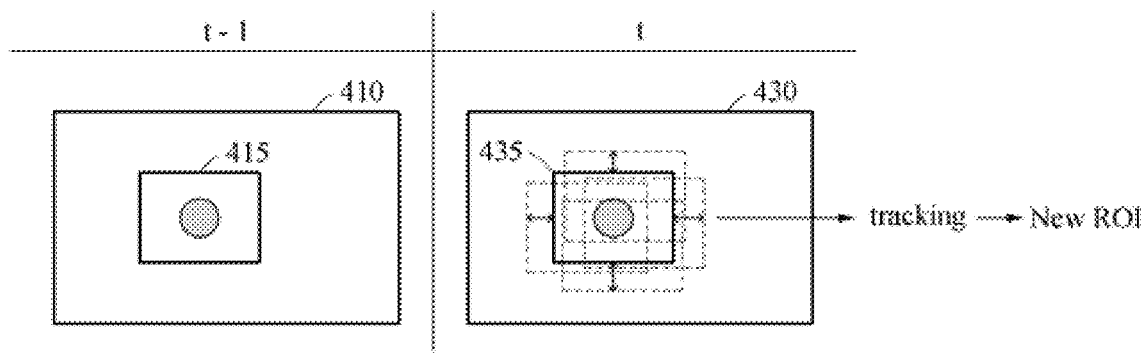
FIGS. 4A and 4B are diagram illustrating estimating information of a second region of interest (ROI), according to an example embodiment.
Figure 4B:
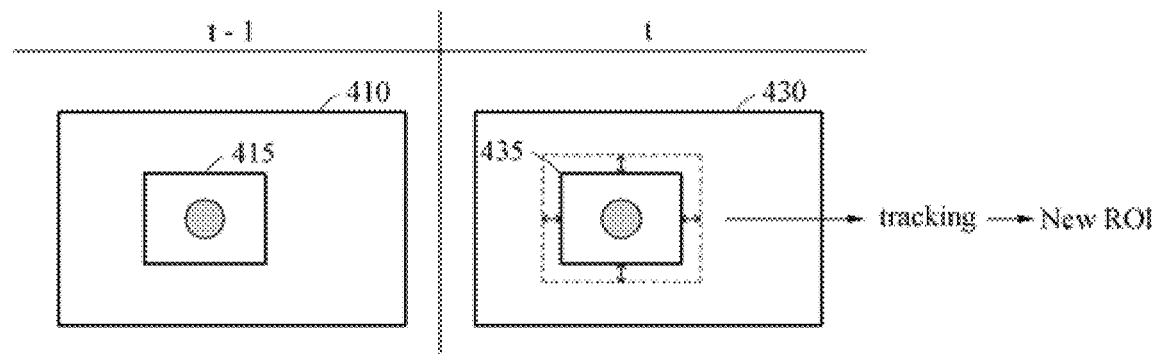

FIGS. 4A and 4B are diagrams illustrating estimating information of a second ROI, according to an example embodiment. FIG. 4A illustrates an example of determining information of a second ROI 435 of a second frame 430 by adjusting a first ROI 415 of a first frame 410. An image processing apparatus according to an example embodiment may set pixel coordinates of the second ROI 435 of the second frame 430 to be the same as those of the first ROI 415 of the first frame 410. When all of objects of interest are not tracked in the second ROI 435, the image processing apparatus may adjust position information of the second ROI 435 by a predetermined (or, alternatively, desired) distance in every direction and may determine new information, for example, new pixel coordinates, of the second ROI 435 that includes all of the objects of interest.

FIG. 4B illustrates an example of determining information of the second ROI 435 of the second frame 430 by adjusting size information of the first ROI 415 of the first frame 410.

Similar to the example embodiment of FIG. 4A, the image processing apparatus may set pixel coordinates of the second ROI 435 of the second frame 430 to be the same as those of the first ROI 415 of the first frame 410. When all of the objects of interest are not tracked in the second ROI 435, the image processing apparatus may adjust size information of the second ROI 435 to be expanded and may determine new information, for example, pixel coordinates, of the second ROI 435 that includes all of the objects of interest.

Figure 5A:
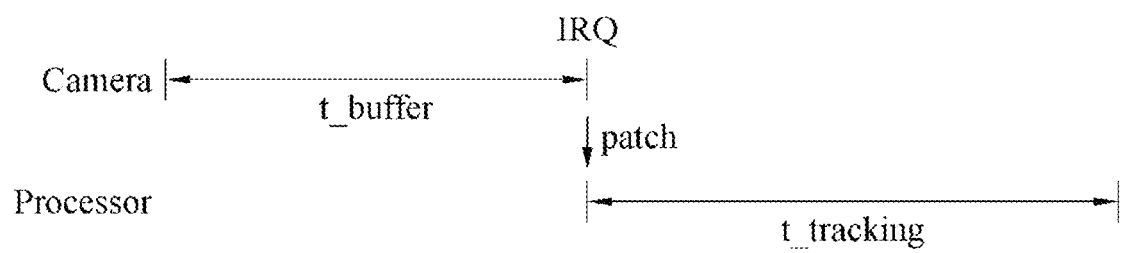
FIGS. 5A and 5B are diagrams illustrating a latency of an image processing apparatus, according to an example embodiment.
Figure 5B:
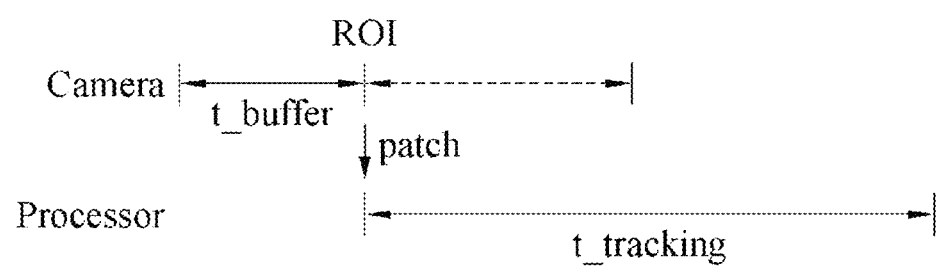

FIGS. 5A and 5B are diagrams illustrating a latency of an image processing apparatus, according to an example embodiment. FIG. 5A illustrates an example of a latency of a general image processing apparatus. The general image processing apparatus may use a global shutter method of a camera that senses and processes an image based on a frame. Alternatively, the general image processing apparatus may use a rolling shutter method of a camera that senses and processes an image based on a line unit. As described above, the general image processing apparatus waits during t_buffer until a single frame sensed by the camera is fully stored in a memory. In response to an occurrence of an interrupt (IRQ) notifying that the single frame is fully stored, the general image processing apparatus may patch the whole single frame and a processor may track an ROI and/or an object of interest from the image during t_tracking.

FIG. 5B illustrates an example of a latency of an image processing apparatus according to an example embodiment. The image processing apparatus according to an example embodiment does not wait for the entire frame to be stored in a memory and a processor, particularly, tracking software run on the processor may actively read only information of a desired region, for example, an ROI from information stored in the memory. When information of the desired region is fully stored in the memory, the image processing apparatus may patch the corresponding information, for example, information of the ROI such that the processor may track the ROI and/or the object of interest from the image during t_tracking.

According to example embodiments, without a need to wait until the entire frame is stored in a memory, tracking software may actively read information of a desired region and thus, t_buffer may decrease, which leads to minimizing a total latency.

Figure 6:
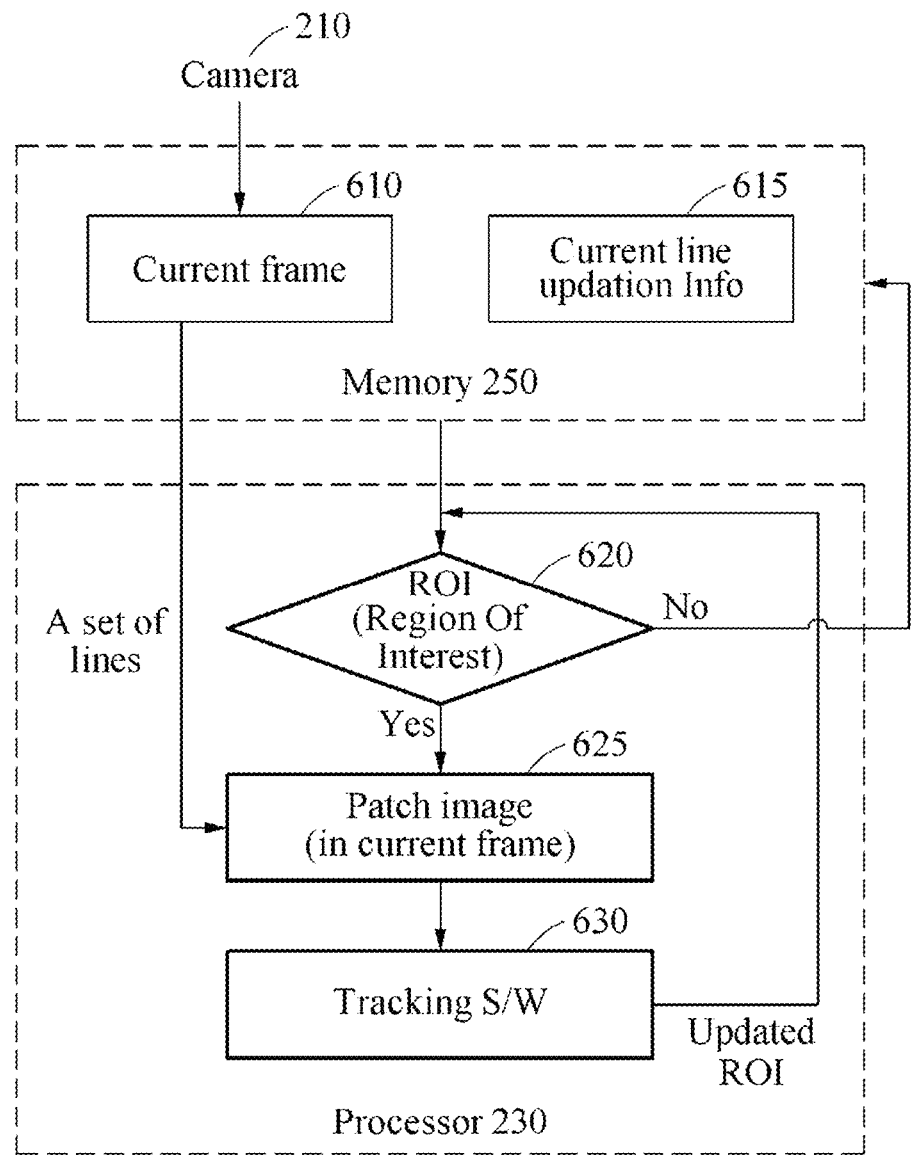
FIG. 6 is a flowchart illustrating an image processing method according to another example embodiment.

FIG. 6 is a flowchart illustrating an image processing method according to another example embodiment. Hereinafter, an image processing process performed by the camera 210, the memory 250, and the processor 230 of the image processing apparatus will be described with reference to FIG. 6.

Referring to FIG. 6, when a current frame is sensed using the camera 210 in operation 610, subframes that constitute the current frame may be sequentially stored in the memory 250 for each line-based subframe. Here, every time storing is completed for each subframe, the image processing apparatus may update line information corresponding to a subframe that is stored last among the subframes in operation 615.

In operation 620, the processor 230 may determine whether subframes currently stored in the memory 250 include an ROI based on the updated line information. When the stored subframes are determined to not include the ROI in operation 620, the processor 230 may read and store a line-based next subframe that constitutes the current frame in operation 610 and may update line information corresponding to the next subframe in operation 615.

Conversely, when the stored subframes are determined to include the ROI in operation 620, the memory 250 may patch the stored subframes, that is, the subframes that are currently stored in the memory 250 in operation 625. In operation 630, the processor 230 may track the ROI by running tracking software. The processor 230 may update information of the ROI based on the tracking result.

The image processing apparatus may sequentially store subframes that constitute a next frame of the current frame in the memory 250 for each line-based subframe.

Figure 7:
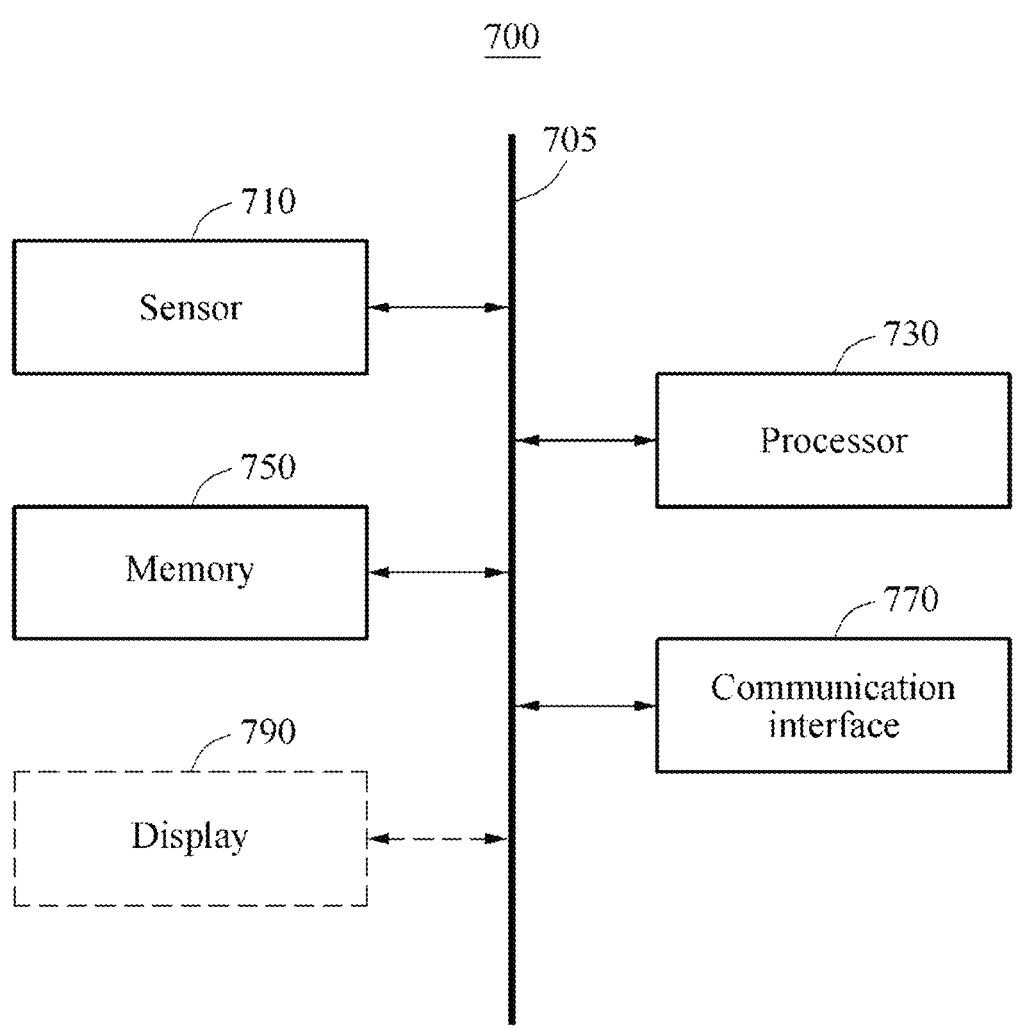
FIG. 7 is a block diagram illustrating an image processing apparatus according to an example embodiment.

FIG. 7 is a block diagram illustrating an example of an image processing apparatus according to an example embodiment. Referring to FIG. 7, an image processing apparatus 700 may include a sensor 710, a processor 730, a memory 750, a communication interface 770, and a display 790. The sensor 710, the processor 730, the memory 750, the communication interface 770, and the display 790 may communicate with one another through a communication bus 705.

The sensor 710 may sense an image, such as a first frame and a second frame. The sensor 710 may be, for example, a camera sensor using a camera shutter method, an image sensor, and a vision sensor. The image may be, for example, a facial image of a user and a driving image of a vehicle.

The processor 730 acquires information of a first ROI in the first frame. The processor 730 estimates information of a second ROI in the second frame received after the first frame based on information of the first ROI. The processor 730 determines whether the subframes currently stored in the memory 750 include the second ROI based on information of the second ROI. The processor 730 processes at least a portion of the stored subframes based on a result of determining whether the stored subframes include the second ROI.

The processor 730 may perform any one or any combination of the methods described above with reference to FIGS. 1 to 6 or an algorithm corresponding thereto. The processor 730 may execute a program and may control the image processing apparatus 700. A code of the program executed by the processor 730 may be stored in the memory 750. The processor 730 may include, for example, a CPU and a GPU.

The memory 750 may sequentially store subframes that constitute the second frame for each line-based subframe. The memory 750 may be, for example, a volatile memory or a non-volatile memory.

The communication interface 770 may receive, from the sensor 710, image information that includes an image, such as the first frame and the second frame. The communication interface 770 may output a processing result of the processor 730. Depending on example embodiments, the communication interface 770 may transmit driving information of a vehicle determined by the processor 730 to an outside of the image processing apparatus 700 or the display 790. Also, the communication interface 770 may receive a driving image captured from the outside of the image processing apparatus 700 or may receive information of various sensors received from the outside of the image processing apparatus 700.

The display 790 may display a processing result of the processor 730. For example, when the image processing apparatus 700 is embedded in the vehicle, the display 790 may be configured as a HUD installed in the vehicle.

The example embodiments described herein may be implemented using hardware components, software components, and/or a combination thereof. For example, the apparatuses, methods, processing device, and components described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules to perform the operations of the above-described example embodiments, or vice versa.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An image processing method comprising:
acquiring information of a first region of interest (ROI) in a first frame;
estimating information of a second ROI in a second frame that is received after the first frame, based on the acquired information of the first ROI;
sequentially storing, in a memory, subframes that are a portion of the second frame, each of the subframes being a line of the second frame;
determining whether a portion of the stored subframes comprises the second ROI, based on the estimated information of the second ROI while the second frame is being stored in the memory; and
based on a determination that the portion of the stored subframes comprise the second ROI, tracking the second ROI in the portion of the stored subframes before the entire second frame is stored in the memory.

2. The image processing method of claim 1, wherein the information of the first ROI comprises any one or any combination of position information of the first ROI, size information of the first ROI, and shape information of the first ROI.

3. The image processing method of claim 1, further comprising sequentially receiving the subframes, using a camera of a rolling shutter method.

4. The image processing method of claim 1, wherein the estimating of the information of the second ROI comprises setting the acquired information of the first ROI as the information of the second ROI.

5. The image processing method of claim 1, wherein the estimating of the information of the second ROI comprises:
adjusting the acquired information of the first ROI; and
determining the adjusted information of the first ROI as the information of the second ROI.

6. The image processing method of claim 1, wherein the second frame follows the first frame.

7. The image processing method of claim 1, wherein the line of the second frame is either horizontal or vertical.

8. The image processing method of claim 1, wherein the sequentially storing of the subframes comprises accumulating the subframes on a region that is pre-allocated in the memory.

9. The image processing method of claim 1, further comprising storing line information of a subframe that is stored last among the subframes, every time one of the subframes is stored.

10. The image processing method of claim 1, further comprising shifting a first logic value in a shift register corresponding to the second frame, every time one of the subframes is stored.

11. The image processing method of claim 1, wherein the processing of the portion of the stored subframes comprises:
updating the information of the second ROI, based on a result of the second ROI being tracked.

12. The image processing method of claim 1, wherein the processing of the portion of the stored subframes comprises:
masking a remaining subframe excluding the second ROI, in the second frame; and
processing the second ROI, using the second frame in which the remaining subframe is masked.

13. The image processing method of claim 1, further comprising, based on a determination that the portion of the stored subframes does not comprise the second ROI, storing, in the memory, a next subframe that is a line of the second frame, as one of the stored subframes.

14. The image processing method of claim 1, wherein the processing of the portion of the stored subframes comprises:
   patching the portion of the stored subframes; and
   tracking the second ROI, using the patched portion of the stored subframes.

15. The image processing method of claim 1, wherein the sequentially storing the subframes of the second frame comprises:
   sequentially storing the second frame line by line in a first memory; and
   storing, in a second memory, line information corresponding to a currently updated line of the second frame in the first memory.

16. The image processing method of claim 15, further comprising:
   verifying, based on the line information stored in the second memory, whether information corresponding to the second ROI is in the currently updated line of the second frame in the first memory.

17. A non-transitory computer-readable storage medium storing instructions that, when executed by a processor, cause the processor to perform the image processing method of claim 1.

18. An image processing apparatus comprising:
   a processor configured to:
   acquire information of a first region of interest (ROI) in a first frame; and
   estimate information of a second ROI in a second frame that is received after the first frame, based on the acquired information of the first ROI; and
   a memory configured to sequentially store subframes that are a portion of the second frame, each of the subframes being a line of the second frame,
   wherein the processor is further configured to:
   determine whether a portion of the stored subframes comprises the second ROI, based on the estimated information of the second ROI; and
   based on a determination that the portion of the stored subframes comprise the second ROI, tracking the second ROI in the portion of the stored subframes before the entire second frame is stored in the memory.

19. The image processing apparatus of claim 18, wherein the information of the first ROI comprises any one or any combination of position information of the first ROI, size information of the first ROI, and shape information of the first ROI.

20. The image processing apparatus of claim 18, further comprising a communication interface configured to sequentially receive the subframes acquired, using a camera of a rolling shutter method.

21. The image processing apparatus of claim 18, wherein the processor is further configured to set the acquired information of the first ROI as the information of the second ROI.

22. The image processing apparatus of claim 18, wherein the processor is further configured to:
   adjust the acquired information of the first ROI; and
   determine the adjusted information of the first ROI as the information of the second ROI.

23. The image processing apparatus of claim 18, wherein the second frame follows the first frame.

24. The image processing apparatus of claim 18, wherein the line of the second frame is either horizontal or vertical.

25. The image processing apparatus of claim 18, wherein the memory is further configured to accumulate the subframes on a region that is pre-allocated in the memory.

26. The image processing apparatus of claim 18, wherein the processor is further configured to store line information of a subframe that is stored last among the subframes, every time one of the subframes is stored.

27. The image processing apparatus of claim 18, wherein the processor is further configured to shift a first logic value in a shift register corresponding to the second frame, every time one of the subframes is stored.

28. The image processing apparatus of claim 18, wherein the processor is further configured to:
   update the information of the second ROI, based on a result of the second ROI being tracked.

29. The image processing apparatus of claim 18, wherein the processor is further configured to:
   mask a remaining subframe excluding the second ROI, in the second frame; and
   process the second ROI, using the second frame in which the remaining subframe is masked.

30. The image processing apparatus of claim 18, wherein the memory is further configured to, based on a determination that the portion of the stored subframes does not comprise the second ROI, store a next subframe that is a line of the second frame, as one of the stored subframes.

* * * * *